(12) United States Patent
Linder

(10) Patent No.: US 10,889,269 B2
(45) Date of Patent: Jan. 12, 2021

(54) VEHICLE WASHING SYSTEM

(71) Applicant: WASHTEC HOLDING GMBH, Augsburg (DE)

(72) Inventor: Thomas Linder, Welden (DE)

(73) Assignee: WASHTEC HOLDING GMBH, Augsburg (DE)

(*) Notice: Subject to any disclaimer, the term of this patent is extended or adjusted under 35 U.S.C. 154(b) by 198 days.

(21) Appl. No.: 15/744,466

(22) PCT Filed: Oct. 12, 2016

(86) PCT No.: PCT/EP2016/074488
§ 371 (c)(1),
(2) Date: Jan. 12, 2018

(87) PCT Pub. No.: WO2017/064128
PCT Pub. Date: Apr. 20, 2017

(65) Prior Publication Data
US 2018/0208160 A1    Jul. 26, 2018

(30) Foreign Application Priority Data
Oct. 12, 2015 (DE) .................. 10 2015 013 095

(51) Int. Cl.
*B60S 3/04* (2006.01)
*B05B 1/26* (2006.01)
*B05B 7/00* (2006.01)
*B60S 3/00* (2006.01)

(52) U.S. Cl.
CPC ............... *B60S 3/04* (2013.01); *B05B 1/267* (2013.01); *B05B 7/0018* (2013.01); *B60S 3/002* (2013.01)

(58) Field of Classification Search
CPC .. B60S 3/00; B60S 3/002; B60S 3/004; B60S 3/006; B60S 3/04; B60S 3/06; B60S 3/063; B60S 3/066; B08B 3/00; B08B 3/003; B08B 3/02; B08B 3/04; B05B 1/20; B05B 1/267; B05B 7/0018; B05B 7/0025; B05B 7/0416
See application file for complete search history.

(56) References Cited

U.S. PATENT DOCUMENTS

| 3,081,041 A | * | 3/1963 | Showalter, Jr. | ......... B05B 1/267 239/532 |
| 4,912,782 A |   | 4/1990 | Robbins |   |
| 5,725,003 A | * | 3/1998 | Jaakkonen | ............... B60S 3/04 134/123 |

(Continued)

FOREIGN PATENT DOCUMENTS

| DE | 19542855 A1 | 5/1997 |
| JP | 2002046582 A | 2/2002 |

OTHER PUBLICATIONS

International Search Report dated Dec. 5, 2016 for PCT/EP2016/074488 filed Oct. 12, 2015.

*Primary Examiner* — David G Cormier
(74) *Attorney, Agent, or Firm* — Paul D. Bianco; Stephen Bongini; Fleit Intellectual Property Law

(57) ABSTRACT

A vehicle washing system for cleaning a vehicle located in a washing zone of the vehicle washing system includes a device for creating a foam curtain extending substantially transversely to a longitudinal direction of the vehicle washing system. The device is arranged on the vehicle washing system in such a way as to be vertically adjustable.

15 Claims, 6 Drawing Sheets

(56) References Cited

U.S. PATENT DOCUMENTS

| | | |
|---|---|---|
| 2010/0154844 A1 | 6/2010 | Duterme |
| 2013/0192643 A1 | 8/2013 | Ennis |
| 2015/0274134 A1 | 10/2015 | Turner et al. |
| 2016/0175891 A1* | 6/2016 | Mathys .................... B60S 3/04 239/398 |

* cited by examiner

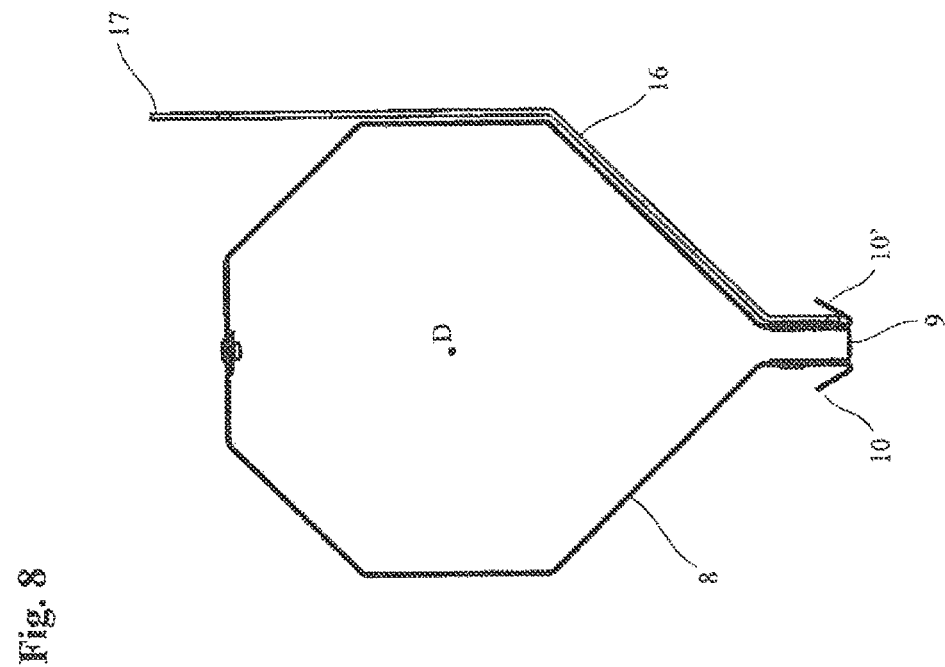
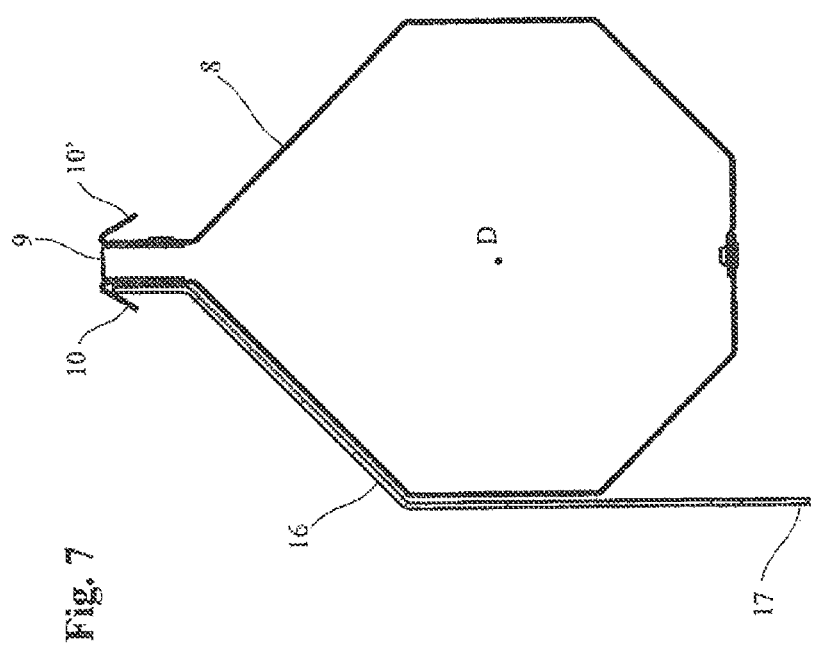

VEHICLE WASHING SYSTEM

FIELD OF THE INVENTION

The invention concerns a vehicle washing system.

BACKGROUND OF THE INVENTION

In known vehicle washing systems, foam is applied to the vehicle via an application device and the vehicle is then cleaned, preferably with washing brushes. It is known to apply the foam in the form of a so-called foam curtain to the vehicle in order to achieve uniform wetting of the vehicle surfaces and to convey to the user a visually appealing impression. For this purpose, spray tubes are ordinarily used, arranged on a washing portal or portal frame of a car wash.

An example of this is disclosed in US 2010/0154844 A1, which depicts a washing portal, on which a single spray tube, extending over the portal columns and the portal traverse, with spray nozzles attached thereto is provided. It has been found that, when the falling height is unduly great, the foam curtain dissipates and breaks up before encountering the vehicle surface. Because of this, on the one hand, the vehicle surfaces are not uniformly wetted with foam and, on the other hand, this produces a visually less appealing image for the user.

SUMMARY OF THE INVENTION

Therefore one aspect of the present invention is to overcome the aforementioned drawbacks and provide a vehicle washing system as well as a method for the cleaning of a vehicle that permits improved foam application.

Additional embodiments of the vehicle washing system according to the invention are also disclosed.

In an embodiment, a vehicle washing system for the cleaning of a vehicle, includes a carrier movable along a washing zone and a foam dispensing device to generate a foam curtain extending transverse to the direction of travel of the carrier, by arranging the foam dispensing device so as to be vertically adjustable on the carrier.

In order to distribute the foam over the entire width of the vehicle being cleaned, the foam dispensing device can include a foam channel with several foam outlets spaced transversely to the direction of travel (L) of the carrier.

The fact that the foam dispensing device includes at least one foam outlet, from which foam emerges under pressure, and a baffle facing the foam outlet, in which case the jet of emerging foam, upon striking the baffle, spreads out in all directions and combines with a foam curtain, can also contribute to uniform distribution of the foam across the direction of travel of the carrier.

The device should also include a runoff edge extending transversely over the washing zone and from which the foam curtain can flow off onto a vehicle situated beneath it in the washing zone. In this case, the foam throughput and the flowability of the foam should preferably be adjusted so that the foam curtain forms a closed foam cover both temporally and spatially along the runoff edge.

The runoff edge is expediently a lower edge of the baffle.

The runoff edge can be lower on both ends than in the center. This serves to permit the foam curtain to flow off to the outside when the foam dispensing device is switched off. It is then advantageous if the foam can be transformed to a waterfall immediately before the foam dispensing mode is switched off by removing air in order to rinse off excess foam from the baffle.

The foam dispensing device is preferably arranged on a drying device of the vehicle washing system that is vertically adjustable. The same drive mechanism can thus be used to adjust the height contour of both devices during movement over a vehicle being cleaned, and a single sensor is sufficient for automatic guiding, which effectively scans the height contour of the vehicle for both devices.

The drying device can include an air duct with air outlets distributed across the direction of travel of the carrier in order to dry the vehicle over its entire width during movement above the vehicle.

One wall of the air duct can be used as a baffle of the foam dispensing device.

The runoff edge can also be provided on one wall of the air duct; in particular, the same shaped sheet can be part of the wall of the air duct in the upper area in order to form the baffle and be at a distance from the wall of the air duct in the lower part in order to form the runoff edge.

The vehicle washing system should be switchable between a foam dispensing mode and a drying mode. Thus, during portal advance, the vehicle can be foamed and preferably dried in a later run.

At least one collection channel can extend along the drying device in order to collect the remaining foam in the drying mode and keep it away from the washing zone. The collection channel should extend over the entire width of the washing zone so that foam residues are diverted at one or both ends of the collection channel or can drip off to the floor without being able to reach the vehicle situated in the washing zone. Such a collection channel can delimit the baffle in order to collect foam residues and keep them away from the vehicle, these residues possibly still adhering to the baffle when switching to the drying mode.

If the collection channel is formed in a single piece from flat material, a side wall of the channel can simultaneously be the side wall of the air outlets.

In order to immediately and reliably stop the dripping of foam onto the vehicle during transition into the drying mode, the drying device can be adjustable between a position in which the collection channel faces the washing zone and a position in which the air outlets face the washing zone.

The adjustment is preferably a pivot movement about an axis, preferably about an axis oriented across the direction of travel of the carrier.

The drying device is preferably freely rotatable by more than 360°; a nonreversible motor is thus sufficient to execute the transition from the foam application position to the drying position and back again.

The angle between both positions is preferably 180°.

The foam curtain can be illuminated, for example, in order to distract the driver of the vehicle during the washing process. For this purpose, lights, preferably LEDs of different color can be arranged in the vicinity of the foam curtain. As an alternative or in addition, lights that illuminate the foam curtain from the outside can be provided. In particular, a projector can be provided in order to project image sequences or video sequences onto the foam curtain. These can be informative or entertaining in content in order to increase the comfort for the driver during the washing process and can also involve advertising with which the operator of the washing system can generate additional income.

Additional details and advantages of the invention are apparent from the following description of preferred embodiment examples with reference to the drawings. In the drawings:

BRIEF DESCRIPTION OF THE DRAWINGS

FIG. 7 shows a sectional view of the nozzle box of the roof dryer with the baffle arranged thereon according to FIG. 5 in the foam application position;

FIG. 8 shows the sectional view from FIG. 7 with the nozzle boxes in the drying position.

DETAILED DESCRIPTION OF THE INVENTION

Figure 1:
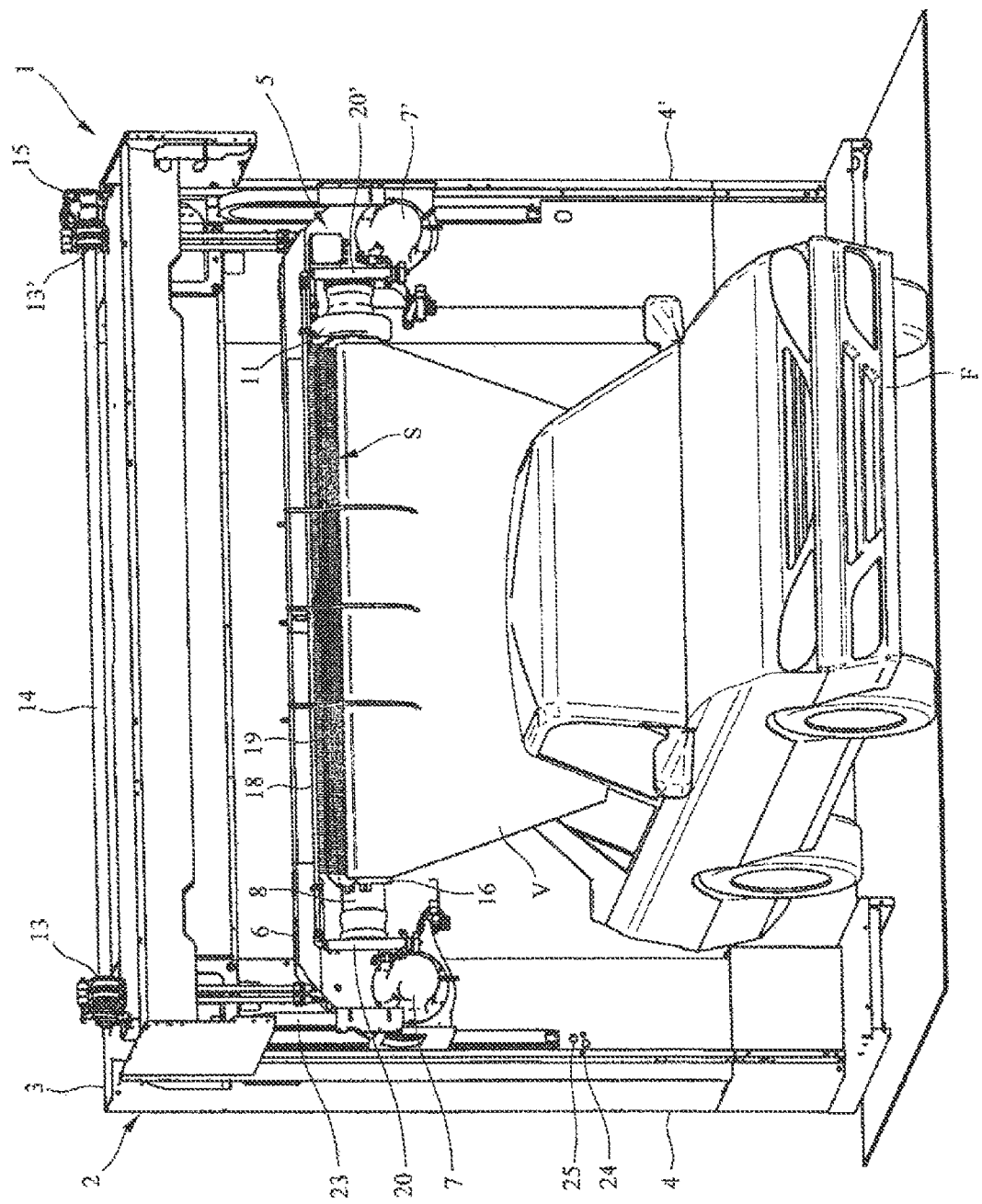
FIG. 1 shows a schematic three-dimensional view of a vehicle washing system according to the invention.
Figure 2:
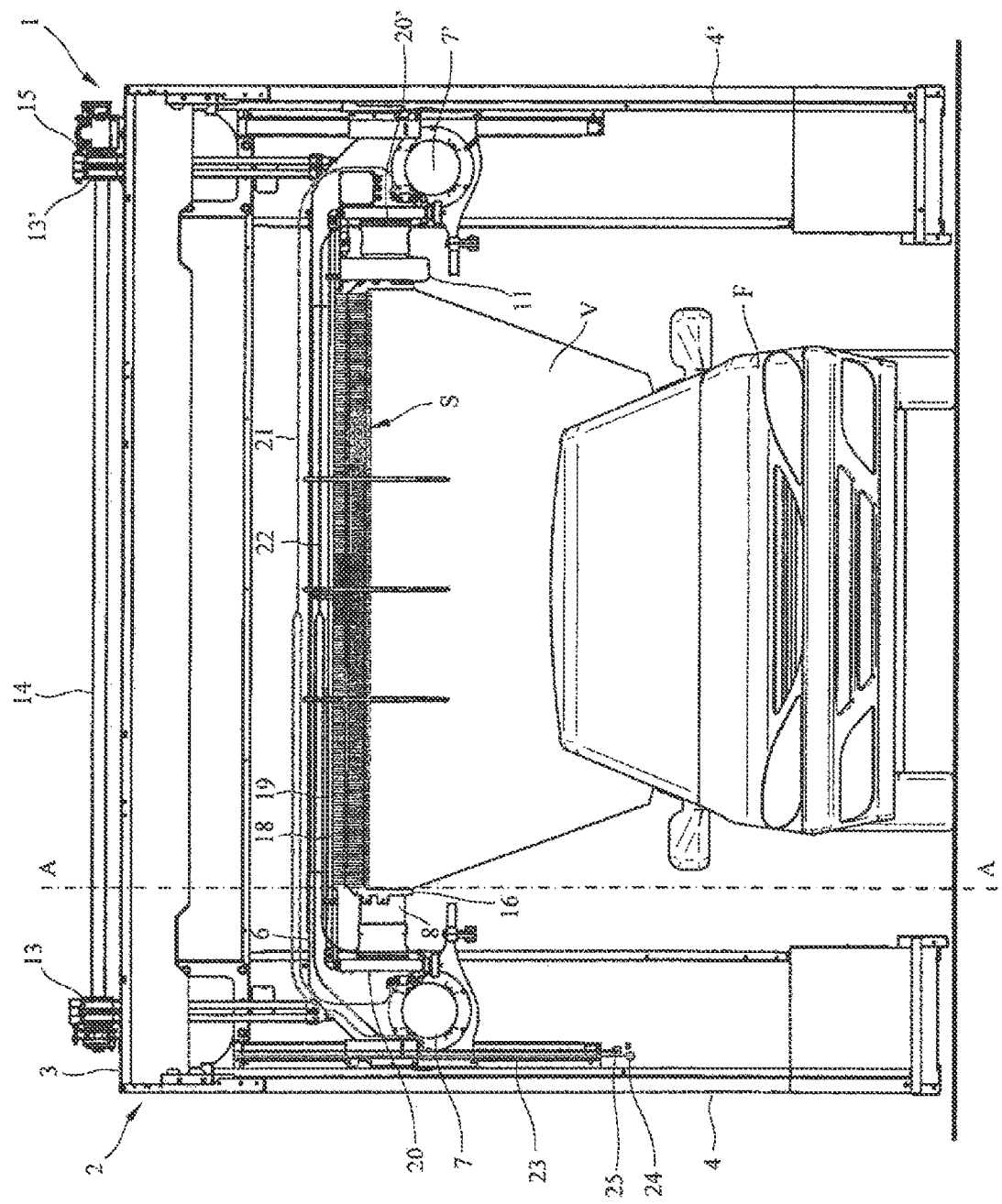
FIG. 2 shows a front view of the vehicle washing system from FIG. 1.
Figure 3:
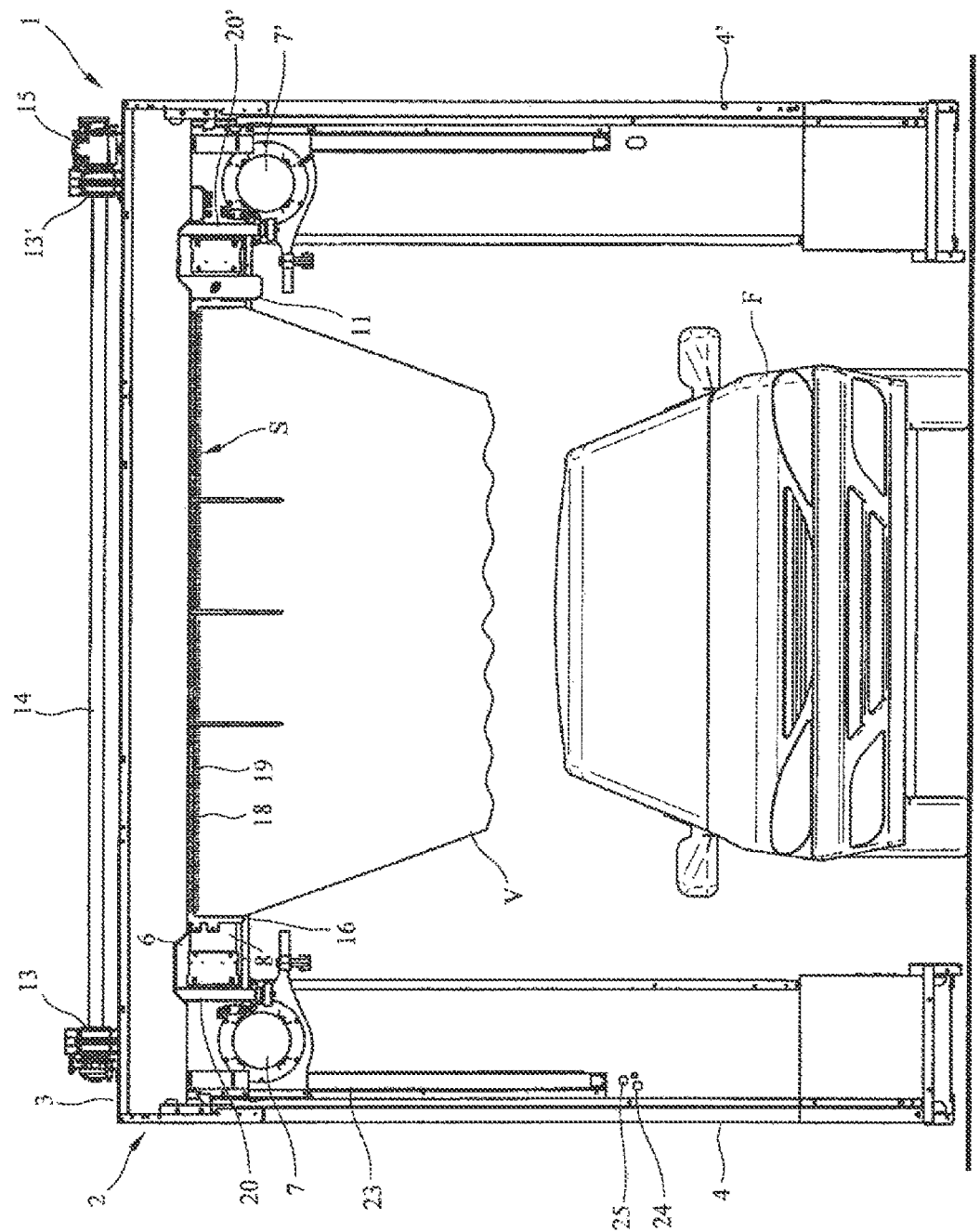
FIG. 3 shows the front view of the vehicle washing system from FIG. 2 with the roof dryer moved fully upward.
Figure 4:
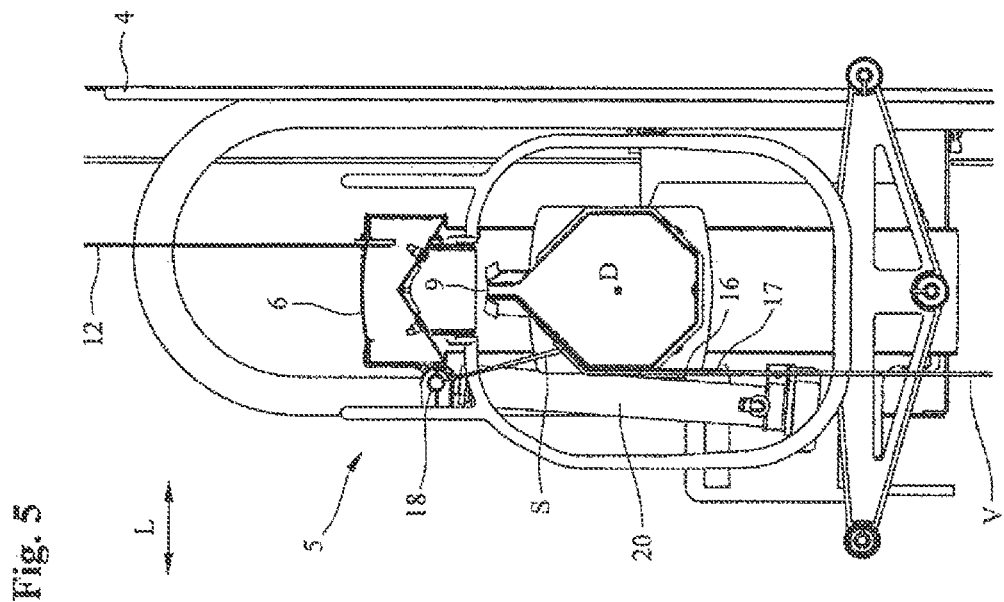
FIG. 4 shows a top view of the vehicle washing system from FIG. 2 along line A-A of FIG. 2 on the left.

FIG. 1 shows a schematic three-dimensional view of the vehicle washing system according to the invention in the form of a portal washing system 1 with a wash portal 2. The wash portal 2 has two essentially vertical portal columns 4, 4' connected to each other by a portal traverse 3. Vertical side washing brushes (not shown) and a horizontal vertically adjustable roof washing brush are arranged in known fashion on wash portal 2, which are subsequently also referred to simply as washing brushes.

The wash portal 2 is movable in a longitudinal direction L of the portal washing system 1 in order to treat, especially wash, optionally polish and dry a vehicle F situated in a washing zone W between the portal columns 4, 4'.

A roof dryer 5 is additionally arranged on the wash portal 2. The roof dryer 5 has a carrier 6 extending over the entire width of the vehicle F, on whose outer sides centrifugal blowers 7, 7' are arranged. The centrifugal blowers 7, 7' blow high-pressure drying air through an air duct extending over the width of the vehicle F with air outlets distributed across the direction of movement of the wash portal 2 relative to the vehicle, here in the form of a nozzle box 8, in which the air outlets are combined to an elongated nozzle slit 9, from which drying air is blown onto the vehicle surfaces.

The roof dryer 5 can also be moved vertically, in which case lifting belts 12, 12' are mounted on the outside on carrier 6, which can be wound and unwound via winding rolls 14, 14'. The winding rolls 14, 14' are arranged on a common winding shaft 15 that can be driven via a lifting drive 15.

In order to generate foam, at least one foam generator 20, 20' and a foam channel (designed here as a tube) which extends it over the entire width of the carrier are provided on the roof dryer 5. A number of spray nozzles 19 are distributed along the foam tube 18. The tube 18 preferably has a diameter of about 20 mm, whereas the spray nozzles 19 preferably have an opening from 1 to 2 mm. The foam tube is dimensioned and positioned so that foam can emerge from all nozzles with the same pressure.

To produce the foam curtain V according to the invention, as shown in FIGS. 7 and 8, a baffle 16 is arranged on the nozzle box 8, which preferably extends over the entire width of the vehicle F. The baffle 16 can be an integral part of a housing of the nozzle box 8; it is preferably formed separately from the housing as a single-piece cutout of flat material, especially sheet metal, and mounted on the housing, which also includes the runoff edge 17 and the collection channel 10.

The aforementioned cutout forms on one end the collection channel 10 and is nestled against two flat wall sections closest to it on one side of the nozzle slit 9 of the essentially octagonal nozzle box 8 and there forms the baffle 16. Starting from the second of these wall sections, which runs parallel to nozzle slit 9, the cutout extends in the foam dispensing position depicted in FIG. 7 downward at least over the second wall section, preferably beyond the nozzle box 8 to a runoff edge 17.

Figure 6:
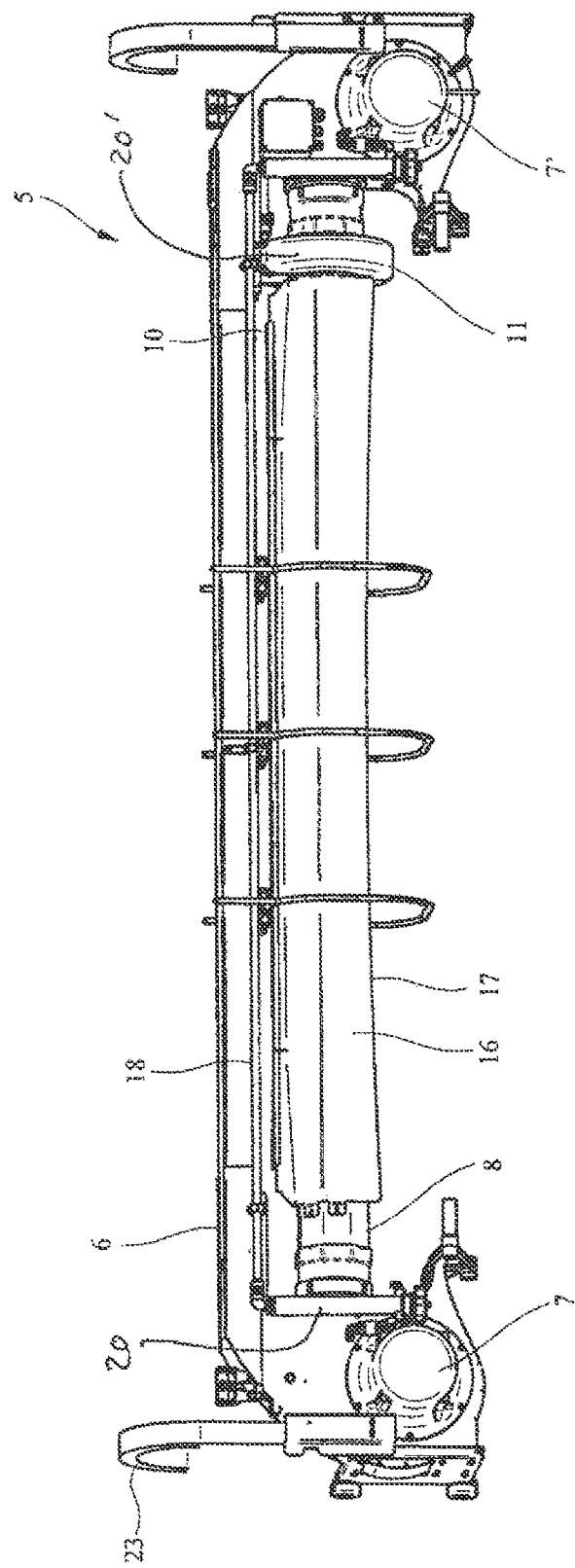
FIG. 6 shows a schematic three-dimensional view of the roof dryer from FIG. 1.

The runoff edge 17 can then preferably have a curved, especially concave, trend along the carrier axis, as is especially apparent in FIG. 6. The lateral outer ends of the runoff edge 17, here in the foam dispensing position, extend somewhat farther downward than the middle part of the runoff edge 17. This serves to allow outflow of the foam curtain to the outside when the foam dispensing device is switched off. It is then advantageous if the foam can be converted into a waterfall immediately before the foam dispensing mode is switched off by removing the air in order to rinse the excess foam from the baffle.

Figure 5:
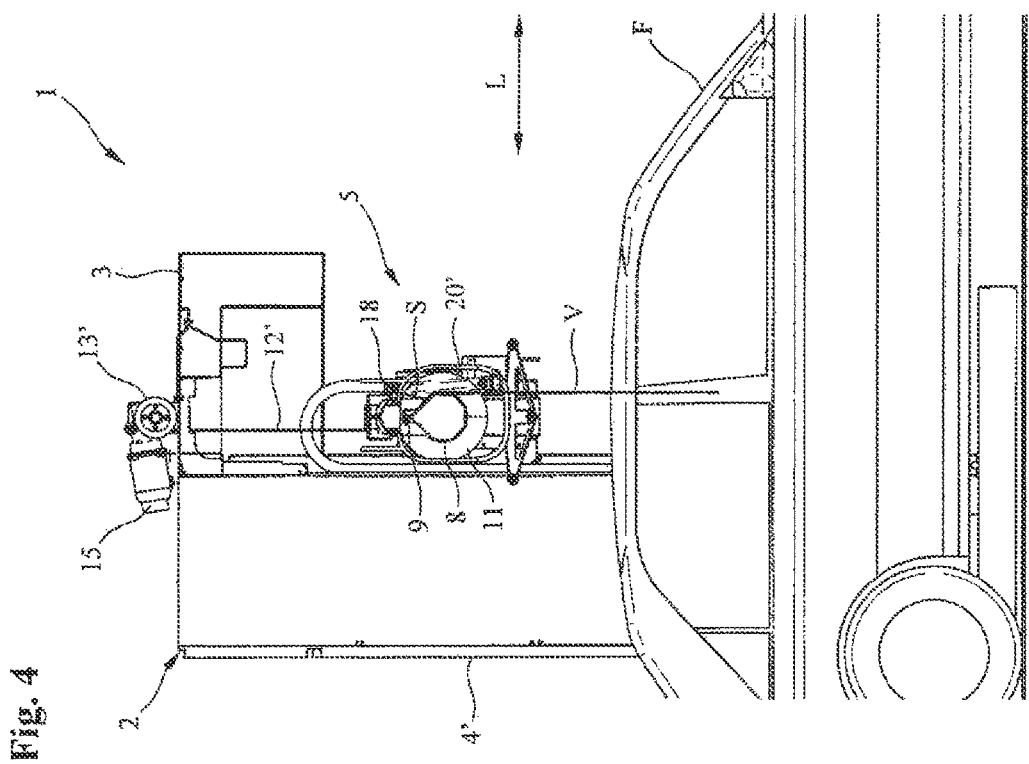
FIG. 5 shows a detailed top view of the vehicle washing system from FIG. 2 along line A-A of FIG. 2 on the right.

The foam curtain V is now generated in that foam S is sprayed onto the baffle 16 from the foam channel 18 arranged above baffle 16 via a number of spray nozzles 19, as is readily apparent in FIG. 5. The foam S then flows downward over the baffle 16 and falls via runoff edge 17 as foam curtain V onto the vehicle. The foam curtain formed in this way is perceived by the user as a continuous foam surface.

The foam curtain V is then guided by means of the vertically adjustable roof dryer 5 at a spacing from the vehicle surfaces so that there is no risk of the foam curtain V dissipating or breaking up before striking the vehicle surfaces.

An always continuous foam curtain V that fully wets the vehicle surfaces uniformly can be generated with this device according to the invention, with relatively limited use of foam liquid. For this purpose, a known contour sensing and contour control can be used to operate the roof dryer 5.

In order to prevent dripping of residual liquid remaining on the roof dryer 5 and especially the nozzle box 8 from previous generation of the foam curtain V or also other treatment steps, it can be advantageously prescribed, as described in the present embodiment example, that the runoff edge 17 be arranged on a side of the nozzle box 8 facing away from the nozzle slit 9. In order to apply foam to vehicle F, the nozzle box 8 is rotated into the foam dispensing position depicted in FIG. 7, in which the runoff edge 17 forms the lower edge of the cutout of the baffle 16, while the nozzle slit 9 points upward.

On the other hand, for the drying of vehicle F, the nozzle box 8 is then rotated 180° into the drying position of FIG. 8, in which the runoff edge 7 lies above the baffle 16. Residual liquid still present on the baffle 16 and the nozzle box 8 can then run off into the collection channel 10. Any foam that still drips off from the foam channel 18 while the nozzle box is in the drying position lands on a side of the housing of nozzle box 8 opposite baffle 16 and goes from there into the collection channel 10' opposite the collection channel 10.

The collection channels 10, 10' can preferably be open on their outer ends no longer situated above the underlying vehicle F so that the collected residual liquid can drip off sideward from vehicle F to the floor. The collection channels 10 can then be slightly sloped downwards from their center to the outer ends in order to facilitate outward runoff of the residual liquid situated therein.

The nozzle box 8 can then have a cross section other than the octagonal cross section depicted in the drawings, for example, a round or oval cross section, to which the baffle 16 is correspondingly adjusted in order to be tightly nestled against the housing of the nozzle box. The runoff edge 17 can also be designed V-shaped or trough-shaped.

Deviating from the figures, the foam channel 18 and the baffle 16 can also be arranged in their own lifting device, which can be moved vertically, independently of the roof dryer 5. The configuration depicted in the figures, however, has the advantage of a compact design requiring few additional components. It can also be simply retrofitted on already existing vehicle washing systems.

LIST OF REFERENCE NUMBERS

1 Portal washing system (vehicle treatment system)
2 Washing portal
3 Portal traverse
4, 4' Portal columns
5 Roof dryer
6 Carrier
7, 7' Centrifugal blower
8 Nozzle box
9 Nozzle slit
10 Collection channel
11 Rotary drive
12, 12' Lifting belts
13, 13' Winding rolls for lifting belts
14 Winding shaft
15 Lifting drive
16 Baffle
17 Runoff edge [sic; Runoff edge]
18 Foam channel
19 Spray nozzle
20, 20' Foam generator
21 Compressed air line
22 Feed line for foam liquid
23 Energy chain
24 Compressed air connection
25 Connection for foam liquid
D Rotational axis nozzle box
F Vehicle
L Longitudinal direction
S Foam spray jets
V Foam curtain

The invention claimed is:

1. A vehicle washing system for cleaning a vehicle, the system comprising:
a carrier movable along a washing zone in a direction of travel;
a vertically adjustable drying device; and
a foam dispensing device arranged on the drying device to generate a foam curtain extending transverse to the direction of travel of the carrier,
wherein the foam dispensing device is arranged so as to be vertically adjustable on the carrier,
wherein the vehicle washing system is switchable between a foam dispensing mode, in which the foam dispensing device is in operation, and a drying mode, in which the drying device is in operation, and
wherein at least one collection channel extends along the drying device in order to keep foam away from the washing zone in the drying mode.

2. The vehicle washing system according to claim 1, wherein the drying device includes an air duct with air outlets distributed across transverse to the direction of travel of the carrier.

3. The vehicle washing system according to claim 2, wherein the at least one collection channel is formed in a single piece from flat material and wherein a side wall of the at least one collection channel is also a side wall of the air outlets.

4. The vehicle washing system according to claim 1, wherein the foam dispensing device includes at least one foam outlet from which foam emerges under pressure, and a baffle facing the at least one foam outlet to collect and divert emerging foam.

5. The vehicle washing system according to claim 1, wherein the foam dispensing device includes a runoff edge extending across the washing zone.

6. The vehicle washing system according to claim 5, wherein the foam dispensing device includes at least one foam outlet from which foam emerges under pressure and a baffle facing the at least one foam outlet to collect and divert emerging foam and wherein the runoff edge is a lower edge of the baffle.

7. A vehicle washing system for cleaning a vehicle, the system comprising:
a carrier movable along a washing zone in a direction of travel;
a vertically adjustable drying device having an air duct with air outlets distributed transverse to the direction of travel of the carrier; and
a foam dispensing device arranged on the drying device to generate a foam curtain extending transverse to the direction of travel of the carrier,
wherein the foam dispensing device is arranged so as to be vertically adjustable on the carrier,
wherein the foam dispensing device includes a runoff edge extending across the washing zone, and
wherein the drying device is pivotable about an axis, between a position in which the runoff edge faces the washing zone and a position in which the air outlets face the washing zone.

8. The vehicle washing system according to claim 7, wherein a nozzle box of the drying device is situated vertically beneath a foam outlet of the foam dispensing device.

9. The vehicle washing system according to claim 7, wherein the foam dispensing device includes at least one foam outlet from which foam emerges under pressure and a baffle facing the at least one foam outlet to collect and divert emerging foam and wherein the runoff edge is a lower edge of the baffle.

10. The vehicle washing system according to claim 7, wherein the vehicle washing system is switchable between a foam dispensing mode, in which the foam dispensing device is in operation, and a drying mode, in which the drying device is in operation, and wherein at least one collection channel extends along the drying device in order to keep foam away from the washing zone in the drying mode.

11. The vehicle washing system according to claim 10, wherein the at least one collection channel is formed in a single piece from flat material and wherein a side wall of the at least one collection channel is also a side wall of the air outlets.

12. The vehicle washing system according to claim 7, wherein the runoff edge is provided on one wall of the air duct.

13. The vehicle washing system according to claim 7, wherein the foam dispensing device includes a foam channel with a plurality of foam outlets spaced across transverse to the direction of travel of the carrier.

14. The vehicle washing system according to claim 7, wherein the runoff edge has first and second end portions and a center portion and wherein the runoff edge is lower at the first and second end portions than in the center portion.

15. A vehicle washing system for cleaning a vehicle, the system comprising:

a carrier movable along a washing zone in a direction of travel;

a vertically adjustable drying device having an air duct with air outlets distributed transverse to the direction of travel of the carrier; and a foam dispensing device arranged on the drying device to generate a foam curtain extending transverse to the direction of travel of the carrier, wherein the foam dispensing device is arranged so as to be vertically adjustable on the carrier, wherein the foam dispensing device includes at least one foam outlet from which foam emerges under pressure, and a baffle facing the at least one foam outlet to collect and divert emerging foam, and wherein the baffle is a wall of the air duct.

* * * * *